United States Patent [19]

Campbell et al.

[11] 3,730,602

[45] May 1, 1973

[54] CARTRIDGE PARTICULARLY SUITABLE FOR DISC RECORD MEMBER

[75] Inventors: Jesse L. Campbell, Lexington, Ky.; Walter F. Klein; Denis E. Lowry, both of Austin, Tex.

[73] Assignee: International Business Machines Corporation, Armonk, N.Y.

[22] Filed: Dec. 20, 1971

[21] Appl. No.: 209,667

[52] U.S. Cl. ..................312/10, 206/16 B, 206/62 P, 221/232

[51] Int. Cl. ..............................................A47b 81/00

[58] Field of Search............................312/10, 15, 18; 206/16 B, 57 R, 62 P; 221/232

[56] References Cited

UNITED STATES PATENTS 1,741,295 12/1929 Haberer ..............................221/232

*Primary Examiner*—James C. Mitchell
*Attorney*—D. Kendall Cooper et al.

[57] ABSTRACT

The present case is directed to a cartridge suitable for a disc recording member, as an example. In a preferred embodiment, provision is made for feeding discs into the cartridge from the side and ejecting discs from the front of the cartridge. The cartridge has a manual kicker for ejection of discs by the operator. Usually, discs are placed in the cartridge one at a time but facilities are included that enable entry of a plurality of discs through the eject opening by use of an incline member cooperating with a retaining spring.

6 Claims, 6 Drawing Figures

INVENTORS
JESSE L. CAMPBELL
WALTER F. KLEIN
DENIS E. LOWRY

BY D. Kendall Cooper
ATTORNEY

CARTRIDGE PARTICULARLY SUITABLE FOR DISC RECORD MEMBER

REFERENCE TO PATENTS, PENDING APPLICATIONS, AND PUBLICATIONS OF INTEREST

U. S. Pat. application Ser. No. 157,566, filed June 28, 1971, having Frank E. Becker as inventor and entitled "Audible Indexing for Dictation Apparatus".

U. S. Pat. application Ser. No. 877,313, filed Nov. 17, 1969, having N. K. Perkins, et al. as inventors and entitled "Constant Time Measured Review".

U. S. Patent application Ser. No. 96,568, filed Dec. 18, 1970, having W. L. Dollenmayer as inventor and entitled "Unique Pressure Pad for minature Disk Recorder".

The following U. S. patents are also of interest in connection with the cartridge structure. U. S. Pat. Nos. 3,090,089; 3,061,085; 3,415,365; 2,152,174; 2,840,642; 2,725,143 and 2,555,594. The first referenced patent shows a dispenser and sterilizer for clinical thermometers in which the thermometers are loaded and ejected at right angles. The second, third and fourth patent references show containers for flat media having a spring to hold the media in place. The other patent references are included as being of general interest in that they show containers for recording media in which the media are loaded and ejected from the same slot. Insofar as such references may be analogous to the present cartridge, they are believed to be non-anticipatory.

Another case of interest in connection with the present case is U. S. Pat. application Ser. No. 209,800 filed Dec. 20, 1971 with James D. Bruer, et al., as inventors, and entitled "Dictation Apparatus with Disc Loading, Feeding and Ejecting Feature." Assigned to the same assignee as the present application.

SUMMARY OF THE INVENTION

The present invention is concerned with a cartridge particularly adaptable for receiving, storing, and ejecting disc record media. A cartridge according to the present invention has an input slot and an eject slot, the slots preferably being located at right angles with respect to one another. The cartridge is arranged in such a manner that the input slot accommodates a single disc at a time which may be entered manually or automatically during operation of the associated dictation apparatus, while the eject slot or opening is sufficiently large that a plurality of discs may be accommodated.

Means is provided for an operator to manually eject a stack of discs from the cartridge and further, additional means is provided to enable the reinsertion of a stack of discs through the larger eject opening back into the cartridge.

A disc cartridge of the nature described has particular utility in connection with the dictation apparatus set forth in the Becker, Perkins, et al., and Dollenmayer cases, previously referred to.

OBJECTS

The primary object of the present invention is to provide a cartridge for receiving, storing, or ejecting recording media, such as discs, in a convenient and efficient manner.

A particular object of the present invention is to enable the placement of discs into the cartridge from one direction and ejection or placement of discs from and into the cartridge from another direction, that is preferably at right angles to the first direction. Still another object of the present invention is to provide a cartridge having provision for manual or automatic operation.

A still further object of the present invention is to provide a cartridge for storing discs which enables the entry or ejection of discs through the same opening under manual control.

The foregoing and other objects, features, and advantages of the invention will be apparent from the following more particular description of the preferred embodiment of the invention as illustrated in the accompanying drawings.

DRAWINGS

In the Drawings

DETAILED DESCRIPTION

Figures 1, 2:
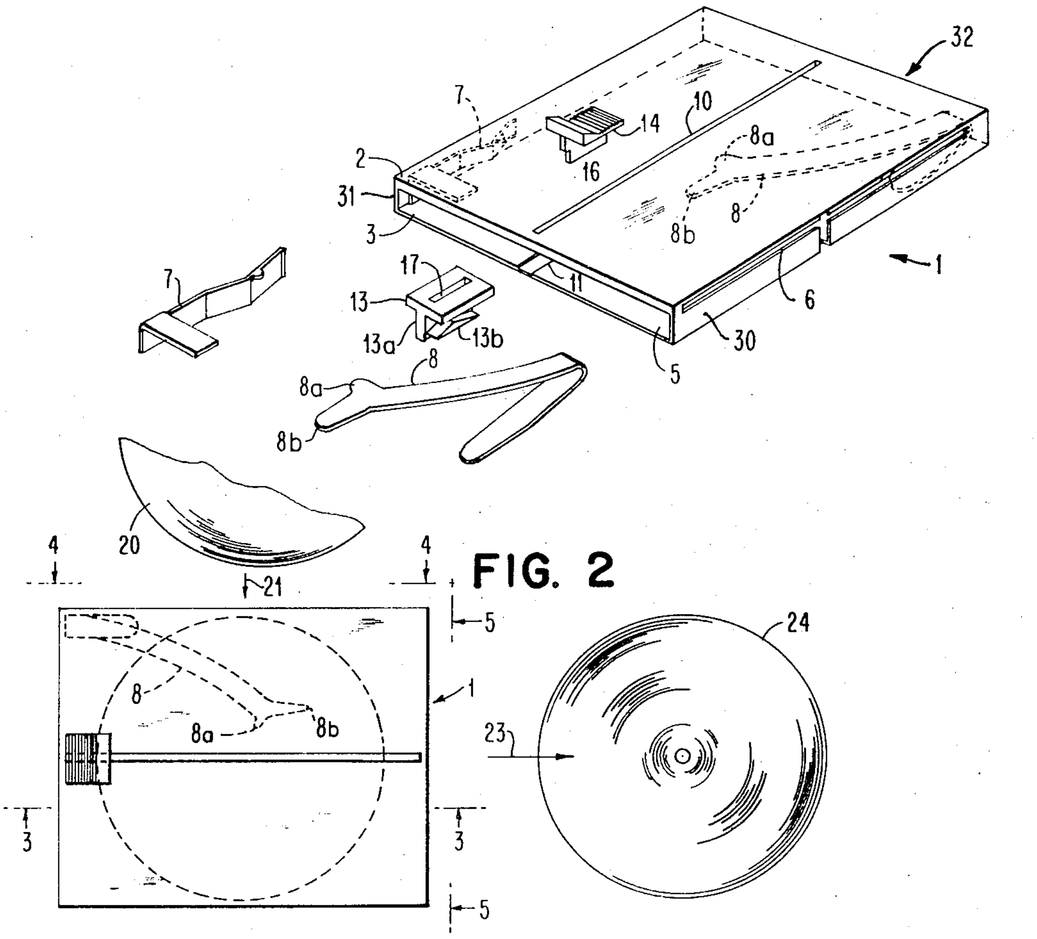
FIG. 1 is a front perspective view of a disc cartridge in accordance with the present invention, showing a manual control means for controlling ejection and entry of discs into the cartridge.
FIG. 2 represents a top elevation of the cartridge of FIG. 1 showing a preferred direction of entry of a disc into the cartridge, a disc in storage position, and a preferred direction of disc ejection from the cartridge.

FIG. 1 illustrates a preferred embodiment of the invention, that is further shown in detail in FIGS. 2–6. Provision is made for manual ejection and loading of a plurality of discs, i.e., a "stack" of discs.

In FIG. 1, cartridge 1 has an upper planar surface 2 and a lower planar surface 3 coextensively positioned and located a predetermined distance apart by the permanently affixed side members 30, 31 and 32, thus forming an eject opening 5. An input slot 6 is arranged in a location on the right side of the cartridge, FIG. 1.

Cartridge 1 incorporates a disc retainer spring 7 serving to retain discs in the cartridge, but movable due to pressure exerted by discs as they are ejected to enable their passage through opening 5. In addition, cartridge 1 incorporates a guide spring 8 having a "goose neck" appearance and positioned in the right rear corner of cartridge 1. Spring 8 extends forwardly and inwardly and exerts slight pressure on any disc stored in cartridge 1. spring 8 may be seen to better advantage in FIGS. 3, 5 and 6. Discs are inserted individually through slot 6 formed in side member 30 into the interior of cartridge 1 and since side member 30 blocks egress after any disc has been fully inserted into the cartridge, ejection occurs through opening 5. This may be for the convenience of a dictator or transcriber, or when the cartridge is used for insertion of discs into any apparatus with which the cartridge is associated, such as that set forth in U. S. Patent application Ser. No. 209,800. Cartridge 1 incorporates a slot 10 and a channel 11 accommodating a kicker 13 and associated slider knob 14. Knob 14 has an extension 16 arranged for insertion in slot 17 of kicker 13. In an assembled state, knob 14 and kicker 13 slide backwardly and forwardly in slot 10 and channel 11 from the rear of cartridge 1 toward the front eject opening 5, and vice versa.

Operation of the cartridge in FIGS. 1–6 is best seen in FIG. 2 where a disc 20 moves as indicated by arrow 21 through slot 6 to the interior of cartridge 1. During injection, a disc or stack of discs is moved out from cartridge 1 preferably at a right angle with movement as indicated by arrow 23 and disc 24. The embodiment of FIGS. 1–6 is particularly intended for manual operation and as can be visualized when a plurality of discs are stored in the cartridge, the surface **13*a* of kicker 13 is co-extensively positioned in a vertical direction so that it will contact any disc in the cartridge and move the same or a plurality of discs out of the cartridge through eject opening 5. A plurality of discs 25 are shown in position in cartridge 1 in FIG. 6 with spring 8 resting on top of the stack maintaining a slight pressure thereon. It is assumed that all discs have been moved out of the cartridge in FIG. 5 and spring 8 thereupon drops to rest on lower planar surface 3 rather than in its upward position shown in FIG. 6**.

Figure 3:
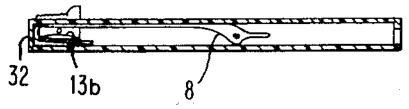
FIG. 3 is a cross-sectional view of the cartridge of FIG. 1 on the line 3—3, FIG. 2.
Figure 4:
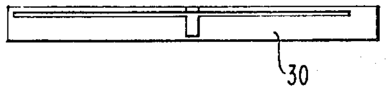
FIG. 4 is a right side elevation of the cartridge on the line 4—4, FIG. 2.
Figure 6:
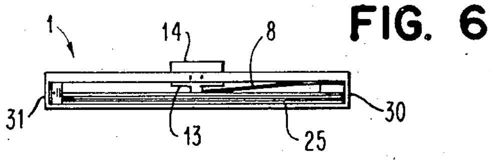
FIG. 6 is a front elevation that is similar to FIG. 5, with the exception that it shows a plurality of discs in position in the cartridge.

In order to enable the insertion of a large number of discs back into cartridge 1, kicker 13 is provided with a double incline plane portion **13*b* that is best seen in FIGS. 1 and 3 and that is arranged for cooperation with a portion 8*a* of spring 8. The user of the cartridge slides knob 14 and kicker 13 in slot 10 until the high portion of incline surface 13*b* is under portion 8*a* of spring 8. This raises spring 8 sufficiently so that a number of discs can then be inserted through eject opening 5 back into storage in cartridge 1**.

Figure 5:
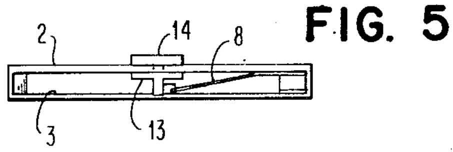
FIG. 5 is a front elevation of the cartridge on the line 5—5, FIG. 2.

Alternatively, portion **8*b* of spring 8 can be formed upwardly so that when spring 8 is in its lowermost position shown in FIG. 5, portion 8*b* touches or proximates the bottom surface of upper planar surface 2 thereby allowing sufficient room for a plurality of discs to be inserted into cartridge 1 through opening 5**.

From the foregoing, it is evident that a cartridge structure has been provided that enables convenient processing of record members.

While the invention has been particularly shown and described with reference to several embodiments, it will be understood by those skilled in the art that various changes in form and detail may be made without departing from the spirit and scope of the invention.

What is claimed is:

1. A cartridge for receiving, storing, or ejecting a record member or the like, comprising:

a housing, said housing comprising, first and second planar members each having a similar shape with four edges, said planar members being coextensively arranged and spaced apart in generally parallel planes a predetermined preferred distance to accommodate at least one said record member therebetween, and said housing further comprising three permanently affixed side members interconnecting said planar members on each of three edges of said planar members and serving to support said planar members in spaced relation thereby forming a first aperture between the fourth edges of said planar members of sufficient size to accommodate at least a said record member for movement into the interior of said cartridge, and a particular one of said permanently affixed side members having formed therein a second aperture of sufficient size to accommodate a single said record member for movement into the interior of said cartridge, said particular one of side members further serving to block egress through said second aperture of any said record member after it has been fully inserted into the interior of said cartridge, said first and second apertures being arranged so that the direction of movement of a said record member through one aperture is substantially at right angles to the direction of movement of said record member through the other of said apertures.

2. The cartridge of claim 1 further comprising:

resilient guide means positioned adjacent said second aperture for guiding a said record member inserted in said second aperture into a preferred location within the interior of said cartridge.

3. The cartridge of claim 1 further comprising:

movable resilient retaining means for retaining a said record member in the interior of said cartridge and located in proximity to a said record member, said retaining means being responsive to movement of a said record member thereagainst to move sufficiently to allow passage of a said record member past said resilient retaining means.

4. The cartridge of claim 1 further comprising:

slider means;

means mounting said slider means adjacent said record member storage area and for sliding movement within the interior of said cartridge; and means extending from said slider means for contacting any record member in said storage area during sliding movement in order to move said record member from said storage area through the first one of said apertures.

5. The cartridge of claim 1 comprising:

resilient guide means biased in a preferred direction and positioned to maintain a said record member in a preferred location within the interior of said cartridge; and actuator means for moving said guide means oppositely to said preferred direction to enable free movement of a said record member.

6. The apparatus of claim 5 wherein said actuator means further comprises:

a double inclined plane surface positioned for movement against said guide means and operable during such movement to oppositely move said guide means.

* * * * *